Figure 3:
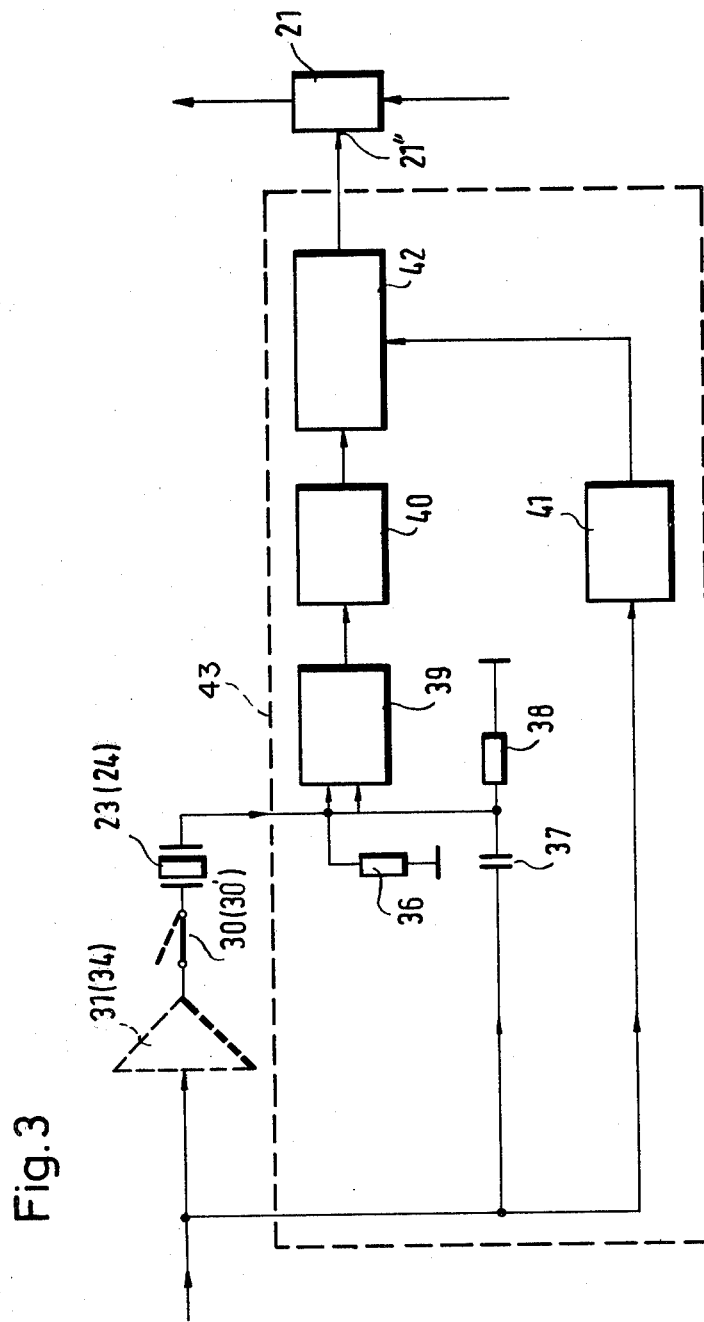

United States Patent [19]

Krause

[11] 4,389,899
[45] Jun. 28, 1983

[54] APPARATUS FOR MEASURING THE SPEED OF FLOW OF FLOWABLE MEDIA

[76] Inventor: Gerhard Krause, 26e Wachtelweg, 8200 Rosenheim, Fed. Rep. of Germany

[21] Appl. No.: 200,166

[22] Filed: Oct. 24, 1980

[30] Foreign Application Priority Data

Oct. 30, 1979 [DE] Fed. Rep. of Germany ....... 2943810

[51] Int. Cl.$^3$ .............................................. G01F 1/66
[52] U.S. Cl. ............................................... 73/861.28
[58] Field of Search ............ 73/861.27, 861.28, 861.29

[56] References Cited

U.S. PATENT DOCUMENTS

| | | |
|---|---|---|
| 3,720,105 | 3/1973 | Cirulis . |
| 3,818,757 | 6/1974 | Brown ............................. 73/861.28 |
| 3,894,431 | 7/1975 | Muston et al. .................... 73/861.29 |
| 4,003,256 | 1/1977 | Donelan et al. . |
| 4,069,713 | 1/1978 | Gassmann ....................... 73/861.28 |
| 4,162,630 | 7/1979 | Johnson . |

FOREIGN PATENT DOCUMENTS

| | | |
|---|---|---|
| 7782 | 6/1980 | European Pat. Off. . |
| 2024882 | 1/1972 | Fed. Rep. of Germany . |
| 2351290 | 4/1974 | Fed. Rep. of Germany . |
| 2431346 | 2/1976 | Fed. Rep. of Germany . |
| 2530114 | 12/1976 | Fed. Rep. of Germany . |
| 2530202 | 1/1977 | Fed. Rep. of Germany . |
| 1434633 | 5/1976 | United Kingdom . |

OTHER PUBLICATIONS

"Versatile Flow Meter"-*Ultrasonics*, vol. 10, No. 5, Sep. 1977, p. 204.
"Ultrasonic Flow Meter for Meas. Pure & High Polluted Fluids"-*Technisches Messen*, 1979, vol. 3, pp. 113-116.
C. Knapp—Geshwindigkeits–und Mengenmessung "Utrashalls", 1958, pp. 1-40.

*Primary Examiner*—Charles A. Ruehl
*Attorney, Agent, or Firm*—Townsend and Townsend

[57] ABSTRACT

The speed of a flowing medium is measured by determining the transit time of sound pulses transmitted alternately in opposite directions between first and second transmitter-receivers 23, 24 spaced apart in the direction of flow. A processing circuit 18, 19, 20 evaluates the speed of flow from the difference between the transit times in the two directions. The transit times in the two directions are measured by separate but identical first and second pulse circuits 11, 11'. Each pulse circuit includes a variable frequency generator 13 the frequency of which is so regulated by the transmitted pulse from the pulse generator 12 and the pulse E received from the associated transmitter-receiver that the reciprocal of its frequency is equal to the transit time in the associated direction. Delay circuitry 21 is able to delay the trigger pulse applied to the frequency generator 13 from the pulse generator 12 so as to take account of transit time errors in the apparatus.

14 Claims, 3 Drawing Figures

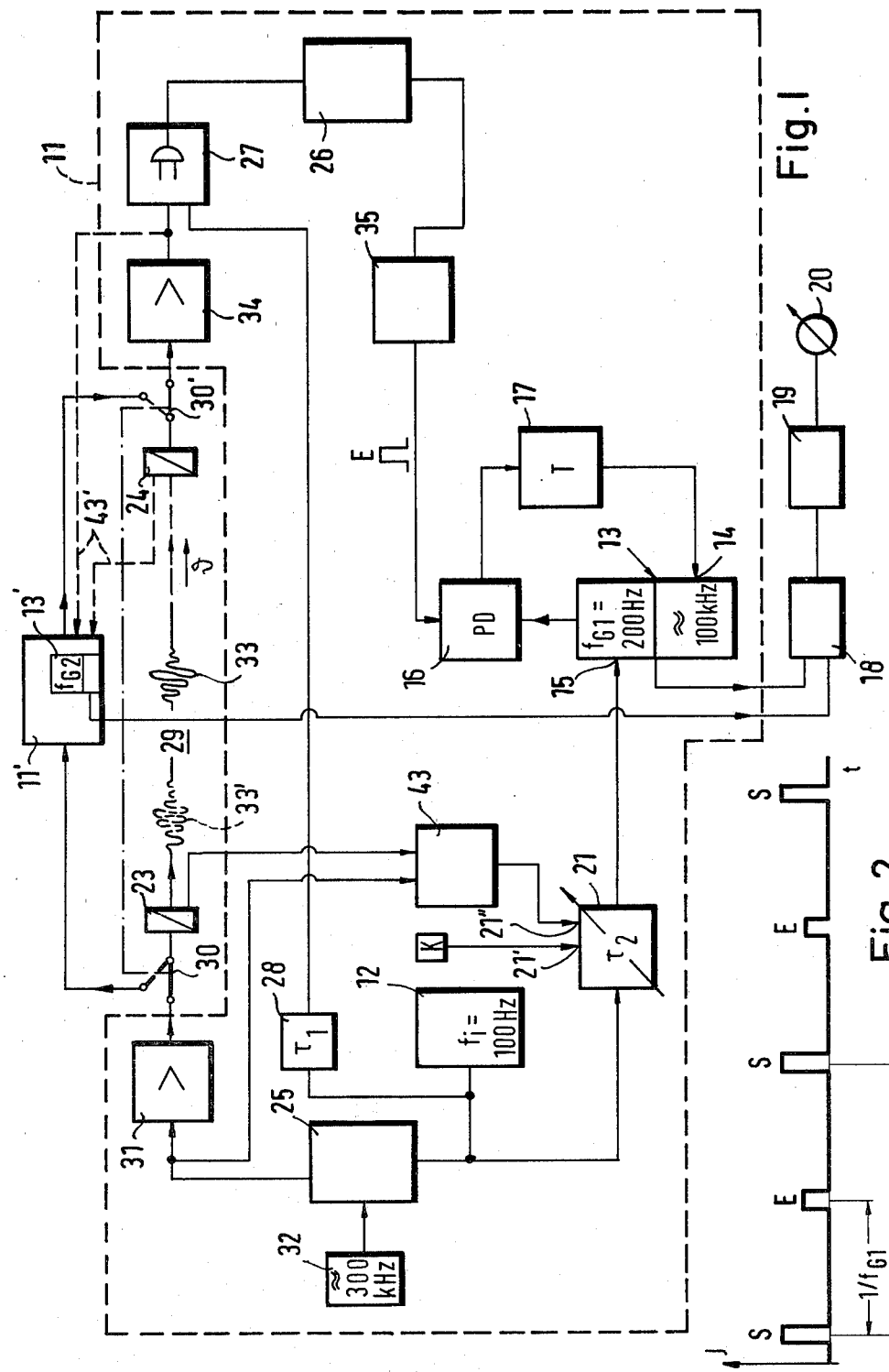

APPARATUS FOR MEASURING THE SPEED OF FLOW OF FLOWABLE MEDIA

The invention relates to apparatus for measuring the speed of flow of flowable media by determining the transit time of sound waves in the media.

In known apparatus of this kind first and second transmitter-receivers in the form of electroacoustic converters are arranged spaced apart in the direction of flow. The arrangement is such that an imaginary line joining the first and second transmitter-receivers has at least a component in the direction of the flow to be measured. Sound pulses are sent alternately in a first direction from the first transmitter-receiver to the second transmitter-receiver and in a second direction opposite to the first direction from the second transmitter-receiver to the first transmitter-receiver. A processing circuit is able to determine the speed of flow from the transit times of the sound pulses in the first and second directions.

It will be appreciated that the transit time of the sound pulses depends on the speed of propagation of sound through the flowing medium.

One device suitable for measuring the speed of sound in a flowable medium such as gas or water is disclosed in DE-OS No. 20 24 882. This known device does not however enable the transit time error occurring in the apparatus itself to be compensated. Moreover, the known device also has the disadvantage that the time intervals required for measurements in the two directions has to be relatively large because a number of pulses must be measured in the one direction before the measurement can be effected in the other direction and this second measurement also requires a number of sound pulses. The measurement error introduced by measuring devices of this kind which operate by means of sound waves represents a significant problem because the speed of flow has to be determined from the difference of very large measured values.

The low change-over frequency in the known device between the two directions of measurement is a disadvantage because the flow velocity of the medium and the speed of sound can already have changed in the time between the change-over from the measurement in one direction to the measurement in the other direction, for example due to bubbles and changes in temperature. The exclusion of echoes is also difficult with the known arrangement because the repetition frequency of the sound pulses depends on the speed of sound and because no pause can be inserted between receipt and transmission. Measures also have to be taken to suppress oscillations at a harmonic of the basic frequency. In principle it is also basically possible to measure at the same time in both directions. It is then however necessary to work with different carrier frequencies in the two directions and both a transmitter and a receiver have to be provided at opposite ends of the path along which the measurement is made. Both these measures however give rise to the disadvantage that the errors along the measurement paths, in the electroacoustic converters and in the circuitry can no longer be adequately compensated.

The principal object underlying the present invention is thus to provide apparatus of the initially named kind which only requires two electroacoustic converters which can be connected as required to act as transmitters or receivers, which enables a constant pulse frequency to be used, which enables individual pulses to be alternately transmitted in one of the two possible directions and which enables transit time errors in the apparatus to be corrected in simple manner.

A further object of the invention is to allow the compensation for the transit time error in the apparatus to be automatically adjusted to take account of the instantaneously prevailing size of this error.

Further objects of the present invention will become clear from the subsequent description and claims and include the avoidance of the other disadvantages of the known device.

In order to accomplish these objects the invention envisages an arrangement of the initially named kind in which pulse circuits are provided, which for each of said first and second directions have available:

(a) a pulse generator operating at a first specific frequency, (b) a frequency generator which preferably operates at a higher frequency, said frequency generator having a frequency control input and a setting or trigger input to which pulses of the pulse generator are applied, and (c) a phase detector having first and second inputs to which received pulse signals and the output of the frequency generator are respectively applied with the output of said phase detector being passed to a mean value forming stage which is in turn connected to the frequency control input of the frequency generator and which regulates the frequency of the frequency generator to a value corresponding to the time interval between the arrival of a pulse at the setting input and the arrival of the received pulse signal at the phase detector, and wherein the frequencies of the frequency generators are passed to the processing circuit.

As a result of this construction the transit times are directly converted into frequencies which can be generated and measured with great accuracy even with analogue techniques. As a result of the use of a controllable frequency generator with follow up control via the mean value forming stage it is possible to form the mean value of the signal with very simple analogue means without giving rise to a loss of accuracy. A further advantage of the measuring apparatus of the present invention is the fact that the transit times, and thus the frequencies representing the velocity of sound in the various directions, are continuously available. As a result the complexity of the control circuits is considerably reduced and intermediate storage of information is avoided.

In one particularly advantageous embodiment the frequency generator is formed by a series connection of a high frequency oscillator and a frequency divider. The frequency of the high frequency oscillator is controlled by the mean value forming stage.

In the simplest case the mean value forming stage can take the form of a low pass filter. A sample and hold circuit can also be used for the mean value forming stage.

The transmission time error of the apparatus can be removed in simple manner from the apparatus of the present invention by arranging a delay device in front of the setting input of the frequency generator with the delay introduced by the delay device being equal to the transit time errors in the transmission and receiving circuit including the error introduced by the associated transmitter-receivers. The delay introduced by the delay device is usefully made controllable with the transmit time error being preferably measured during the operation of the apparatus and the delay introduced by the delay device being adapted to take account of the prevailing transmit time error. For this purpose the delay device preferably has a control input whereby, by way of example, the delay introduced by the delay device can be controlled as a function of the measured temperature of the associated converter and/or the apparatus. A temperature dependent change in the transit time error can in this way be taken into account in a simple manner.

In one advantageous and practical embodiment a modulator is connected between each pulse generator and its associated transmitter-receiver with the pulse signals being used to modulate a higher frequency signal supplied to the modulator and a corresponding demodulator being provided at the receiver end. Furthermore, a gate circuit can be arranged in the receiving channel with the gate circuit being so controlled from the pulse generator via a further delay device that the gate circuit is only open for a time corresponding approximately to the time of arrival of the received pulse. The receiving circuit is thus only active for a period of time in which the arrival of a pulse can be expected. As a result disturbances and undesired echoes are suppressed.

The invention will now be described in more detail by way of example only with reference to the accompanying drawings which show:

FIG. 1 a schematic block circuit diagram of an apparatus in accordance with the present teaching, FIG. 2 a pulse diagram for illustrating the manner of operation of the apparatus of FIG. 1, and FIG. 3 a block circuit diagram of the detector circuit 43 of FIG. 1.

The measuring apparatus of the present invention consists of two, identically constructed, pulse circuits 11, 11' of which, in view of the identical construction, only the first pulse circuit 11 is shown in detail in FIG. 1. The second pulse circuit 11' is indicated simply as a block.

First and second transmitter-receivers 23, 24 which are each in the form of electroacoustic converters are spaced apart in the direction of flow through the measuring section 29. Although the first and second transmitter-receivers 23, 24 are preferably aligned with one another in the direction of flow this is not absolutely essential. It is only necessary for the imaginary line joining the first and second transitter-receivers to have at least a component in the direction of the flow to be measured.

As will be later explained in more detail sound pulses are sent alternately in a first direction from the first transmitter-receiver 23 to the second transmitter-receiver 24 and in a second direction from the second transmitter-receiver 24 to the first transmitter-receiver 23. For this purpose change-over switches 30, 30' which are coupled together connect either the electroacoustic converter 23 to the transmitter side of the first pulse circuit 11 and the electroacoustic converter 24 to the receiver side of the first pulse circuit 11 or, alternatively, the electroacoustic converter 24 to the transmitter side of the second pulse circuit 11' and the electroacoustic converter 23 to the receiver side of the second pulse circuit 11'.

The change-over switches 30, 30', which can readily take the form of electronic switches, are continuously switched to and fro between their two positions at a frequency corresponding approximately to the pulse frequency. The pulse frequency is dependent on the length of the measuring path 29 and on the velocity of sound in the medium. By way of example the pulse frequency can conveniently equal 100 Hz.

FIG. 1 illustrates the condition in which the converter 23 is connected to the transmission side of the first pulse circuit 11 and the converter 24 is connected to the receiver side of this pulse circuit. The converters 23, 24 are located at the end of a measuring section 29 along which a medium flows with the speed v.

The converter 23 is connected via the change-over switch 30 and an amplifier 31 to a modulator 25. In the modulator 25 a high frequency signal with a frequency of approximately 300 kHz coming from a high frequency oscillator 32 is modulated by a rectangular pulse coming from a pulse generator 12. The rectangular pulses coming from the pulse generator 12 have, by way of example, a repetition frequency of 100 Hz. The pulses are relatively narrow in comparison to the time interval between the pulses as can be seen from FIG. 2 where the transmitted pulse (S) is shown as a function of time. As a result of the described arrangement the electroacoustic converter 23 transmits pulse groups 33 at time intervals of $1/f_i$ along the measuring path 29 to the electroacoustic converter 24. This converter serves, in the illustrated position of the switches 30, 30', as a receiver. The pulse signals received by the converter 24 are passed to a demodulator 26 via an amplifier 34 and a gate circuit 27. The demodulator 26 together with a subsequent pulse shaper 35 re-creates the original pulse shape so that a received pulse signal E is present at the outlet of the pulse shaper 35. The shape of the received pulse signal E corresponds to the shape of the transmitted pulse signal S. This is also indicated in FIG. 2. The important feature of the pulse E is however not the width of the pulse but rather the flank of the pulse.

In accordance with the present teaching the pulses of the pulse generator 12 are passed at the transmitter side via a delay device 21, the function of which will be later described, to the second or trigger input 15 of a frequency generator 13 the frequency of which is controllable. In the described embodiment the frequency generator 13 consists of a high frequency oscillator of controllable frequency having, by way of example, a center frequency of 115 kHz, and a frequency divider with a ratio of 1:500 connected to the high frequency oscillator. The frequency generator thus operates with a frequency of 230 Hz. The frequency of the frequency generator is controlled via a frequency control input 14 at the high frequency oscillator part of the generator 13. The output of the frequency generator 13 and the received pulse signal E are respectively passed to first and second inputs of a phase detector 16. The output of this phase detector controls the control input 14 of the frequency generator via a mean value forming stage 17 which is constructed as a low pass filter.

In accordance with the present teaching the layout of the frequency generator 13, the phase detector 16 and the mean value forming stage 17 is such that on the arrival of a pulse at the setting input 15 the phase of the generator 13 is set to a specified condition, for example the null point. After a time interval $1/f_{G1}$ ($f_{G1}$ is defined in FIG. 2) a pulse signal is present at the output of the frequency generator 13, and thus at the second input of the phase detector 15, and the phase of this pulse is compared with the phase of the received pulse signal E supplied to the first input of the pulse detector 15. The output signal of the phase detector 16 together with the mean value forming stage 17 now controls the frequency of the generator 13 so that the frequency of the generator 13 is increased if the pulse from the frequency generator arrives later than the received pulse signal at the phase detector 16 and vice versa. In this manner the frequency generator 13 is regulated to a frequency $f_{G1}$ the reciprocal of which is equal to the transit time of the pulse along the measuring section 29. As the high frequency oscillator of the frequency generator 13 is continuously oscillating a frequency signal which corresponds exactly to the transit time is continuously available at the frequency generator.

In corresponding manner a frequency signal $f_{G2}$ is generated at the frequency control frequency generator 13' of the second pulse circuit 11'. The reciprocal of this frequency signal $f_{G2}$ is the same as the transit time of the pulse 33' from the second converter 24 to the first converter 23 as is illustrated in broken lines in FIG. 1. The common change-over of the change-over switches 30, 30' from the first pulse circuit 11 to the second pulse circuit 11' takes place in a sequence such that one pulse is allowed to pass from the first converter 23 to the second converter 24, or from the second converter 24 to the first converter 23, with the change-over taking place after the passage of this pulse. With a repetition frequency of 100 Hz the change-over between the two directions thus takes place every 1/100 of a second and this is completely adequate to ensure the same flow conditions for the two directions of sound propagation.

The outputs of the frequency generators 13, 13' are subsequently passed to a processing circuit which evaluates the speed of flow from the transit times of the sound pulses in the first and second directions. The processing circuit firstly includes a difference forming stage 18 in which the difference of the frequencies on the oscillators 13, 13' is measured. The difference signal is proportional to the speed of flow. A subsequent switching stage 19 multiplies the difference signal by a constant in dependence on the division ratio in the generator 13 and the length of the measurement path. If required an analogue digital conversion can also be carried out in the switching stage 19. A display device 20 is connected to the switching stage 19. The two frequency signals are thus converted in the two stages 18, 19 directly into a signal representative of the speed of flow v of the flowing medium and this signal is then displayed at the display device 20. The pulses of the pulse generator 12 delivered to the setting input 15 can be delayed by a time $\tau_2$ by means of the preferably regulatable delay device 21. The time $\tau_2$ can be regulated to a value corresponding to the transit time errors of the apparatus. The delay device 21 can have a control input 21' to which a signal provided by a temperature error detector K is applied. The delay time can thus be automatically regulated in dependence on the temperature of the apparatus. In this manner temperature dependent transit time errors within the apparatus including the converters 23, 24 are also taken into account.

The delay device 21 can be omitted if, during setting, the counter is not set to zero but rather adjusted to a value which deviates sufficiently from zero that the value zero is achieved only after the desired delay time. It is useful to make this setting difference controllable to change it in dependence on the temperature or other environmental influences.

The pulse generator 12 is in addition connected to the second input of a gate circuit 27 via a further delay device 28 which introduces a delay $\tau_1$. The delay $\tau_1$ is so selected that the gate circuit is only open for a time interval in which the arrival of a received pulse E can be expected. The further delay device 28 thus determines not only the time of opening of the gate circuit 27 but also the duration of the interval for which the gate circuit 27 is open.

As seen in FIGS. 1 and 3 the delay member 21 also has a second control input 21" which is applied to a detector circuit 43 which receives the input signal of the amplifier 31 and also the output signal of the first converter 23.

The detector circuit 43 serves to detect the transit time errors or the delay times or phase displacements of the modulated carrier signal brought about by the amplifier 31 and first converter 23 and to regulate the delay device 21 via the input 21" to introduce a corresponding delay. A similar circuit can be provided for the amplifier 34 and the second converter 24 in the second pulse circuit 11' as indicated by the broken lines 43'.

For accurate measurements it is namely necessary to take account of the fact that the total transit time is composed of the signal transit time through the medium to be investigated, the delay time and also the transit time in the apparatus. The delay times and transit times brought about by the apparatus have to be compensated. The largest part of the delay time of the apparatus is brought about by the electronic converters 23, 24 and, eventually, also by the amplifiers 31 and 34 connected in front of the electronic converters 23, 24. The characteristics of the converters 23, 24, and, if present, also the amplifiers 31, 34 are temperature dependent. The delay times also change in dependence on the age of the circuit elements. The changes of the delay times introduced by the converters 23, 24 and, if present, also the amplifiers 31, 34 can be detected by the detector circuit 43 shown in detail in FIG. 3.

As seen in FIG. 3 the carrier frequency pulse which is in any case present is passed to the electroacoustic converters 23 and 24 respectively. In general the amplifiers 31 and 34 which are only illustrated in broken lines in FIG. 3 are connected in front of the first and second electroacoustic converters 23, 24 respectively.

The current through the converter 23, or 24 is measured as a voltage drop at a resistor 36 which is connected between earth and the one electrode of the converter 23, (or 24).

In order to eliminate the capacity of the converter 23, (or the converter 24) which delivers no information about the delay time of the acoustic signal a series circuit of a capacitor 37 and a further resistor 38 is connected in parallel to the arrangement of the converter 23, (or 24), and the resistor 36 and, if present, the associated amplifier 31 (or 34). The connection point between, on the one hand, the converters 23, 24 and the resistor 36 and, on the other hand, the capacitor 37 and the resistor 38 are applied to the two inputs of a difference forming stage 39. The capacity of the capacitor 37 and the resistances 36, 38, which are significantly smaller than the impedance of the converters at the carrier frequency, are so selected that the capacitive current of the converter 23 (or 24) is compensated. This capacitive current thus provides no signal at the output of the difference forming stage 39.

The mechanical oscillation of the converters 23 and 24, which are preferably piezoelectric converters, however brings about an imbalance of the bridge circuit 33, 36, 37, 38 which makes itself noticable as a finite output signal of the difference forming stage 39. This output signal is demodulated in a demodulator 40. A carrier pulse which is changed or distorted by the mechanical characteristics of the converter is thus present at the output of the demodulator 40. This carrier pulse is time displaced in accordance with the electromechanical transmission factor of the converter 23, or, as appropriate, the converter 24.

The output of the demodulator 40 is applied to a time difference detector 42, the other input of which is applied via further demodulator 41 to the input terminal of the capacitor 37. The demodulator 41 thus delivers a carrier pulse which has not been changed either by the amplifier 31, (or 34) or by the converter 23, (or 24).

A control signal is thus present at the output from the detector with the control signal corresponding to the delay brought about in the carrier pulse by the amplifier 31, (or 34) and by the converter 23, (or 24).

A corresponding delay is produced by applying the signal to the control input 21" in the delay device 21 so that the influence of the amplifier 31 (or 34), and the influence of the converter 23, (or 24), on the accuracy of measurement are eliminated.

In this manner the delay time of the two converters 23, 24 can be measured and added. If necessary one can also limit the measurement to the measurement of the delay time of one converter. The control adjustment for the delay device 21 is then doubled.

The measurement of the phase difference between the carrier pulse and the mechanical oscillation of each of the converters 23 or 24 described with reference to FIG. 3 can advantageously be separately effected so that the circuit elements shown in FIG. 3 would also have to be correspondingly provided in duplicate.

When the transit time error is detected with the aid of the detector 43 the detector K can be omitted.

It will be understood that the pulse shaper 35 can be of very simple construction and can simply take the form of a threshold circuit which generates the rectangular pulses E when the signal received from the demodulator lies above a specific threshold. As previously mentioned the widths of the pulses E are unimportant because the pulse detectors 16 only need to make use of the leading edges of the pulses in effecting the phase comparison with the signals received from the frequency generators 13, 13'. It will also be understood that the delay device 28 can also be of very simple construction; it can for example take the form of a counter which starts to count as a pulse issues from the pulse generator 12 and opens the gate 27 after a predetermined count has been reached. The counter can also be arranged to close the gate 27 after a further predetermined count thus defining the time during which the gate 27 is open. The use of a 300 kHz signal modulated (or gated) by the pulse generator 12 improves the transmission characteristics of the second pulse transmitted through the measuring section thus improving the quality of the signal received at the far end of the measuring section. In principle the signals from the pulse generator 12 could be passed directly to the transmitter-receivers. The transmitter-receivers 23, 24 normally each take the form of a single piezoelectric, electroacoustic converter (or transducer) which can operate either as a transmitter or receiver as required.

It will be appreciated by those skilled in the art that, although the specific embodiment described above uses two distinct pulse circuits for each of the two directions, the circuitry can be so arranged that the duplication of many of the components is unnecessary. The use of suitable switching techniques allows, for example, the use of only a single pulse generator 12 and a single phase detector 16. Two distinct channels for the frequency generator 13, 13' will, however, generally be necessary.

I claim:

1. Apparatus for measuring the speed of flow of flowable media by determining the transit time of sound waves therein, in which first and second transmitter-receivers in the form of electroacoustic converters are spaced apart in the direction of flow with an imaginary line joining said first and second transmitter-receivers having at least a component in the direction of the flow to be measured and in which sound pulses are sent alternately in a first direction from said first transmitter-receiver to said second transmitter-receiver and in a second direction, opposite to said first direction, from said second transmitter-receiver to said first transmitter-receiver, there being a processing circuit for determining the speed of flow from the transit times of the sound pulses in the first and second directions, the apparatus further comprising pulse circuits which for said first and second directions have available:
  (a) a pulse generator operating at a first specific frequency and connected to the associated electroacoustic converter;
  (b) a frequency generator which preferably operates at a higher frequency, said frequency generator having a frequency control input and a setting or trigger input to which pulses of the pulse generator are applied, and
  (c) a phase detector having first and second inputs to which received pulse signals and the output of the frequency generator are respectively applied with the output of said phase detector being passed to a mean value forming stage which is in turn connected to the frequency control input of the frequency generator and which regulates the frequency of the frequency generator to a value corresponding to the time interval between the arrival of a pulse at the setting input and the arrival of the received pulse signal at the phase detector,
  and means for passing the frequencies of the frequency generators to the processing circuit.

2. Apparatus in accordance with claim 1 and characterized in that the frequency generators each consist of a series circuit of a high frequency oscillator and a frequency divider.

3. Apparatus in accordance with either of claims 1 or 2 and wherein the mean value forming state is a low pass filter.

4. Apparatus in accordance with either of claims 1 or 2 and wherein the mean value forming stage is a sample and hold circuit.

5. Apparatus in accordance with claim 1 and wherein a delay device is arranged before the setting input of each frequency generator with the delay introduced by said delay device being equal to the transit time errors.

6. Apparatus in accordance with claim 5 and wherein the delay time introduced by the delay device is controllable.

7. Apparatus in accordance with claim 6 and wherein the transit time errors are measured during the operation of the apparatus and the delay introduced by the delay device is adjusted to suit the actually measured transit time error.

8. Apparatus in accordance with either of claims 6 or 7 and wherein means are provided for varying the delay introduced by said delay device as a function of the measured temperature of the transmitter-receivers and/or the apparatus.

9. Apparatus in accordance with claim 6 and wherein the delay device is so adjusted that the phase difference between the pulse after the delay and the received pulse signal tends to zero when the spacing between the first and second transmitter-receivers is reduced to zero.

10. Apparatus in accordance with claim 6 and wherein the delay time arising from one or both transmitter-receivers, and any amplifier connected to the transmitter-receivers, is determined by a detector circuit with the output signal of the detector circuit being passed to a control input of the associated delay device.

11. Apparatus in accordance with claim 10 and wherein the detector circuit includes a bridge circuit to compensate the capacitive currents in the associated transmitter-receiver.

12. Apparatus in accordance with claim 1 and wherein a modulator is inserted between said pulse generator and the associated electroacoustic converter, a high frequency generator is provided to supply a high frequency signal to said modulator, said pulse generator is connected to said modulator to modulate said high frequency signal, and a demodulator is correspondingly provided at the receiver side of the associated pulse circuit.

13. Apparatus in accordance with claim 1 and wherein a gate circuit is provided at the receiving side of each pulse circuit with said gate circuit being so controlled from the associated pulse generator via a delay device that the gate circuit is only open during a period corresponding to the approximate time of receipt of the pulse received from the associated transmitter-receiver.

14. Apparatus for measuring the speed of flow of flowable media by determining the transit time of sound waves therein, in which first and second transmitter-receivers in the form of electroacoustic converters are spaced apart in the direction of flow with an imaginary line joining said first and second transmitter-receivers having at least a component in the direction of the flow to be measured and in which individual sound pulses are sent alternately in a first direction from said first transmitter-receiver to said second transmitter-receiver and in a second direction, opposite to said first direction, from said second transmitter-receiver to said first transmitter-receiver, there being a processing circuit for determining the speed of flow from the transit times of the sound pulses in the first and second directions, the apparatus further comprising a pulse generator for connection to the electro-acoustic converters, said pulse generator operating at a specific frequency; variable frequency generator means having frequency control input means and trigger input means to which pulses of said pulse generator are applied, a phase detector having a first and second inputs, said inputs being respectively connected to receive pulse signals from said first and second transmitter-receivers when acting as receivers and signals from said variable frequency generator means, said phase detector having further an output, said output being connected to mean value forming means connected in turn to said frequency generator means, which regulates the frequency generator to a value corresponding to the time interval between the arrival of a pulse at the setting input and the arrival of the received pulse signal at the phase detector; and means for passing said frequencies to said processing circuit.

* * * * *

UNITED STATES PATENT AND TRADEMARK OFFICE
CERTIFICATE OF CORRECTION

PATENT NO. : 4,389,899
DATED : 28 June 1983
INVENTOR(S) : Gerhard Krause

It is certified that error appears in the above-identified patent and that said Letters Patent is hereby corrected as shown below:

On the title page, after the inventor's name appears, the name of the assignee should appear as follows:

-- Erwin Sick GmbH, Optik-Elektronik, Waldkirch, West Germany --

Signed and Sealed this

Fifth Day of March 1985

[SEAL]

*Attest:*

DONALD J. QUIGG

*Attesting Officer*     *Acting Commissioner of Patents and Trademarks*